US006876888B2

(12) United States Patent
Locke

(10) Patent No.: US 6,876,888 B2
(45) Date of Patent: Apr. 5, 2005

(54) MODULAR SYSTEM AND METHOD FOR CONTROLLING A MATERIAL HANDLING SYSTEM

(75) Inventor: Gary J. Locke, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 893 days.

(21) Appl. No.: 09/834,067

(22) Filed: Apr. 12, 2001

(65) Prior Publication Data

US 2002/0152004 A1 Oct. 17, 2002

(51) Int. Cl.[7] .............................................. G05B 11/01
(52) U.S. Cl. ............................ 700/20; 700/2; 700/19; 700/213; 700/214; 700/217; 700/247; 700/249; 701/23; 701/24; 701/25; 198/349.6; 198/370.04; 414/339
(58) Field of Search ........................... 700/2–3, 9, 19, 700/20, 213, 214, 217, 247, 249; 414/339; 198/349.6, 370.04; 701/23, 24, 25

(56) References Cited

U.S. PATENT DOCUMENTS

| 4,766,547 | A | * | 8/1988 | Modery et al. ............. 700/229 |
| 4,998,206 | A | * | 3/1991 | Jones et al. ................. 700/96 |
| 5,341,916 | A | | 8/1994 | Doane et al. ............... 700/213 |
| 5,632,589 | A | * | 5/1997 | Bray et al. .................. 414/339 |
| 5,819,189 | A | * | 10/1998 | Kramer et al. ............... 701/22 |
| 2002/0045956 | A1 | * | 4/2002 | Kapitan ........................ 700/56 |
| 2002/0111711 | A1 | * | 8/2002 | Peshkin et al. .............. 700/230 |

FOREIGN PATENT DOCUMENTS

EP 0811567 10/1997

OTHER PUBLICATIONS

European Search Report PCT/US 02/11346.

* cited by examiner

*Primary Examiner*—Ramesh Patel
(74) *Attorney, Agent, or Firm*—Tarolli, Sundheim, Covell & Tummino L.L.P.

(57) ABSTRACT

A control system (60) controls a material handling system and has a first control module (120), a second control module (140), and a third control module (160). The first module (120) includes a first control cabinet (12) for providing primary control to the first module (120), a first external component (20) for controlling an equipment component of the material handling system, and a modular interconnectivity component (30) for interconnecting the first control cabinet (12) and the first external component (20) for control of the first external component (20). The control system (60) further includes a first internal component (20) for operating the first control cabinet (12) and a modular interconnectivity component (30). The first module (120) has primary control of the second module (140) and the third module (160). The first module (120) is interconnectable and interoperable with the second module (140) and the third module (160) such that the second module (140) may assume operational control of the third module (160) in the event that the first module (120) is removed from the control system (60).

16 Claims, 2 Drawing Sheets

MODULAR SYSTEM AND METHOD FOR CONTROLLING A MATERIAL HANDLING SYSTEM

TECHNICAL FIELD

The present invention relates to material handling systems and, more particularly, to a modular apparatus and method for controlling a material handling system.

BACKGROUND OF THE INVENTION

Industry has shifted its focus from implementing islands of automation to implementing material handling systems that tie together those islands of automation. No longer can a complete automation system be factory assembled prior to field deployment, nor can a repetitive system configuration be implemented effectively. Complete modularity of system design, and flexibility of format, are desired to satisfy unique system configurations at the final assembly site.

One approach may be to maintain a repository of material handling and automation system controller hardware designs that are ready for use on virtually any control program, such as a Parcel Sortation System (PSS). The PSS repository of design may be affected within the framework of existing ongoing Parcel Sortation Control Systems (PSCS) activity.

SUMMARY OF THE INVENTION

A control system in accordance with the present invention may be modular in nature with controls mapping directly to the control system's associated mechanical machinery. As part of the control system, parameters may be predefined in order to eliminate the need for any steel fabrication or modifications at the assembly site. The installation of the control system may require nothing more than hand tools, and can be characterized as completely "plug and play".

The control system controls a material handling system and has a first control module, a second control module, and a third control module. The first control module includes a first control cabinet for providing primary control to the first control module, a first series of external components for controlling an equipment component of the material handling system, a modular series of interconnectivity components for interconnecting the first control cabinet and the first series of external component for control of the first external components by the first control cabinet. The control system further includes a first series of internal components for operating the first control cabinet and a series of modular interconnectivity components for interconnecting the first control cabinet and the first internal component for communication between the first internal component and the first control cabinet. The first control module has primary control of the second control module and the third control module. The first control module is interconnectable and interoperable with the second control module and the third control module such that the second control module may assume operational control of the third control module in the event that the first control module is removed from the control system.

BRIEF DESCRIPTION OF THE DRAWINGS

The foregoing and other advantages of the invention will become more readily apparent from the following description of a preferred embodiment of the invention as taken in conjunction with the accompanying drawings, which are a part hereof, and wherein.

DESCRIPTION OF THE PREFERRED EMBODIMENTS

Figure 1:
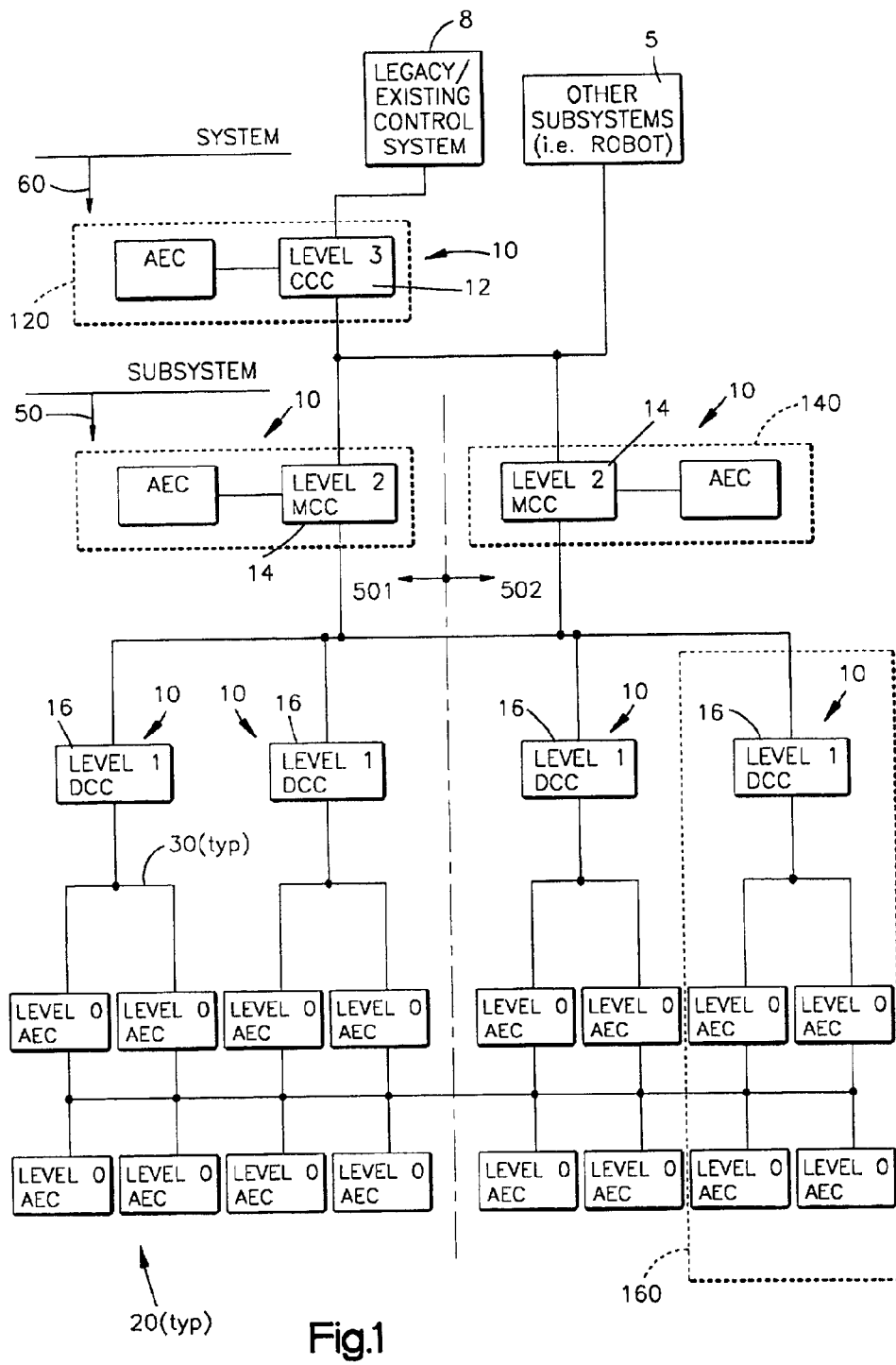
FIG. 1 is a block diagram showing one feature of a control system in accordance with the present invention.

In accordance with the present invention, a control system, or control apparatus, and control method are intended for material handling and automation applications with significant motor loads and full voltage requirements. The control system and method may typically be applied to any material handling and automation equipment components that are motorized. The equipment components may include, but are not limited to, conveyors (i.e., transport and specialty), induction units, shoe sorters, transfer equipment, unloading and loading equipment, vertical lift units, metering equipment, and/or shut off valves. These equipment components are typical of parcel sortation material handling systems.

The control system comprises modular control components combined to "tier up" into a complete control system architecture. Three basic types of modular control components may constitute "three legs" of the control system, as viewed in FIGS. 1 and 2. These modular control components include Control Cabinets (XCCs) 10, Associated External Components (AECs) 20, and Modular Inter-connectivity Components (MICs) 30.

XCCs 10, AECs 20, and MICs 30 are combined to form kits, or modules. One or more of these modules are then used to form a complete subsystem 50. One or more of these subsystems 50 may then be interconnected to form a complete control system 60. Any module, subsystem 50, or system 60 may be augmented with non-system elements, as desired.

There are typically three types, or "families", of control cabinets (XCCs) 10: primary control cabinets, or cell coordination cabinets (CCCs) 12; main control cabinets (MCCs) 14, and distributed control cabinets (DCCs) 16. CCCs 12, MCCs 14, and DCCs 16 are collectively referred to as "XCCs" 10.

Each XCC 10 may have a number of variations. Each type of DCC 16, for example, may have 24 variations in capability or capacity. The design inclusion of these variations may require about ten percent additional effort initially, but may add tremendously to the flexibility of the control system architecture overall.

A CCC 12 may reside at a top system control level (i.e., level 3) and may provide subsystem/module coordination and control, data warehousing, a high level communications hub, an interface with a legacy or existing system 8, and power distribution/options (i.e., different voltages for different types of equipment, etc.). The CCC 12 may typically be located in a centrally located system area.

An MCC 14 may reside at a subsystem (or possibly system) control level (i.e., level 2) and may provide subsystem/module coordination and control, a low level communications hub, and subsystem power distribution/options (i.e., different voltages for different types of equipment, etc.). The MCC 14 may be located in the control center or a control area centrally located within one of the subsystems 50.

A DCC 16 may reside at a machine control level (i.e., level 1) and may provide local machine and bit level control. DCCs 16 are typically single, double or triple motor control cabinets, but up to six motor control cabinets are envisioned with the control system 60 of the present invention. Different types of DCCs 16 may be incorporated into the control system 60 subsequent to the initial assembly depending upon future system requirements. The DCC 16 is typically located at or near the AECs 20 for which it is responsible.

An XCC 10, as predefined, may not satisfy a specific requirement. The XCC 10 may be used, though, as a "build from" baseline solution that is modified as desired by input of additional hardware elements.

AECs 20 reside at the lowest level of the system 60 or subsystem 50 (i.e., level 0) and are the bit level devices and equipment. AECs 20 may include, but are not limited to, emergency stop devices, audio and visual indication devices, sensors (i.e., photoelectric, photo, proximity, and pressure), audio alarms, visual alarms, solenoids, motors, brakes, servos, manual switches, displays, audio monitors, and/or visual monitors. The functionality of some of the AECs 20, such as alarms and monitors, may be integral, or internal, to the XCCs 10.

MICs 30 are the connecting cables used to interconnect the XCCs 10 with other XCCs and AECs 20. The MICs 30 are typically based upon Society of Automotive Engineers (SAE) standards. MICs 30 manufactured to SAE standards are sometimes referred to as "soft-wire" assemblies or devices.

The soft-wire MICs 30 allow for a complete "plug and play" control system 60 for greater flexibility of configurations. The MICs 30 are well defined and provide a highly efficient interconnectivity interface.

The modular components 10, 20, 30 are combined to define the module. A group of modules comprise a system 60 or subsystem 50. All system or subsystem modules may be predefined to form a complete control system 60 or subsystem 50.

The XCCs 10 are typically the first of the three legs of the control system architecture to be defined. Based on the application requirements, the appropriate XCCs 10 may be specified. The module may typically include a CCC 12, or an MCC 14, with a series of DCCs 16 (i.e., a single DCC is capable of stand-alone operation in many configurations, without the need for a higher level XCC).

The AECs 20 are typically the second of the three legs of the control system architecture to be defined. Based on the application requirements, all of the appropriate AECs 20 may be specified.

The MICs 30 are typically the last of the three legs of the control system architecture to be defined. Based on the application requirements, the appropriate MICs 30 needed to interconnect the XCCs 10 and AECs 20 may be specified. A module will typically include an excess quantity of MIC components 30, as the components are applied as required at the time of final field assembly.

The control system 60 may be based on common "families" of modules that are targeted for "hard" reuse across applications. In the event of unanticipated requirements, the control system 60 may be formatted to allow adaptations and extensions for special, or custom, applications.

The control system 60 maintains a "design as required" approach to the creation of technical data. Thus no control systems 60 are assembled without a pending program requirement. Once a program requirement has been created, however, it is available for reuse on other control systems. Over time, and with repeated use, the need to create new control systems will decrease as more and more control systems are defined and implemented.

The control system 60 is based on a directive that control systems should, to the greatest possible extent, be as user friendly as possible to the greatest number of users. The control system 60 recognizes that the control system will affect multiple internal and external systems and finds those parameters that will best empower all users to the greatest practicable extent.

The control system 60 may typically be intended to have a 5 to 7 year "shelf life" and be supportable for up to 15 years. The control system 60 is an open modular architecture control (OMAC) based system. An OMAC system improves the reliability, and decreases the cost, of automation systems by utilizing standards and technology available from broader electronics industry applications, such as automotive, aerospace, and food processing applications.

The OMAC system 60 of the present invention may utilize interoperable, interconnectable, and interchangeable commercial "off the shelf" (COTS) parts available from varied sources of supply. Some of the applied COTS hardware technology may include, but is not limited to, Ethernet, x86 architecture PCs and PLCs (i.e., PC control for CCCs and MCCs and PLC control for MCCs and DCCs), Interbus (i.e., distributed I/O for DCCS), TFT flat screens, resistive touch screens, IEC compliant internal control components, SAE connectorized external control components, and NEMA compliant motors.

As viewed in FIG. 1, the control system 60 described above may be defined as a group of modules with a hierarchy of control. A CCC module 120 has primary control of the entire control system. The CCC module 120 may also interface with the existing control system 8 when retrofitting to other systems. The CCC module 120 may be in communication with other subsystems 5, such as robotic controls, as well. The CCC module 120 controls two MCC modules 140 thereby defining two subsystems 501, 502 to the control system 60 of FIG. 1. Each MCC module 140 controls two DCC modules 160 that are interconnected to each other. The DCC modules 160 control various external components 121 interconnected to each other and the DCC modules. The interconnections allow any of the modules 120, 140, 160 to be removed without losing the functionality of the control system 60. Similarly, modular components 10, 20, 30 or complete modules 120, 140, or 160 may be added with only rudimentary redefining of the system parameters. The capacity of each module component 10, 20, or 30 or each module 120, 140, 160 is therefore the only limiting factor.

Figure 2:
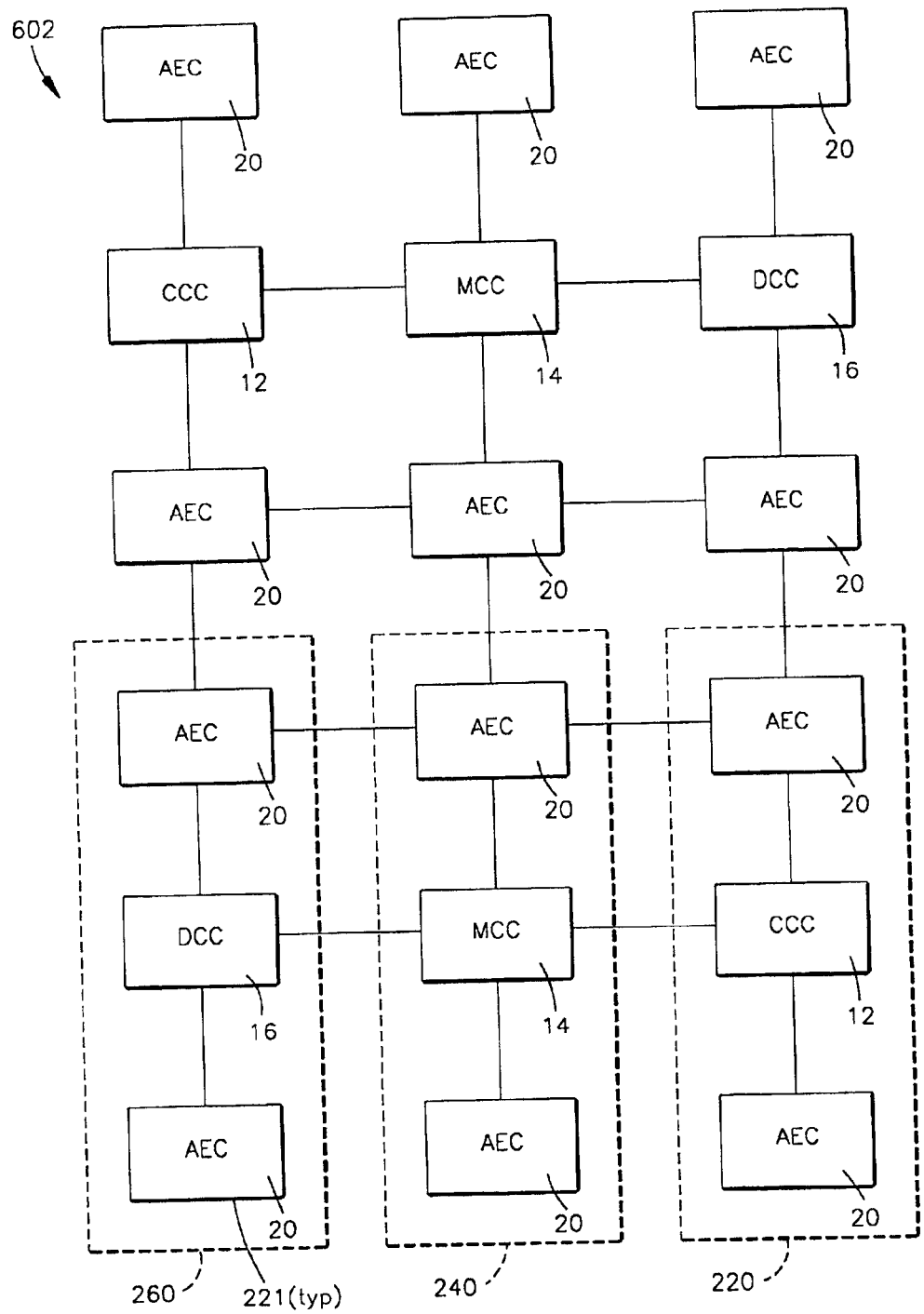
FIG. 2 is a block diagram showing another feature of the control system of FIG. 1

As viewed in FIG. 2, the control system 60 described above may also be defined as a matrix of components or modules with a more flexible hierarchy of control. One of two CCC modules 220 has primary control of the entire control system 602. Alternatively, the two CCC modules 220 may share control. The CCC modules 220 control two MCC modules 240 with no clearly defined subsystems. Each MCC module 240 controls two DCC modules 260 that are interconnected to each other as well. The CCC, MCC, DCC modules 220, 240, 260 control AECs 221 interconnected to each other. The AECs 221 will be external to the control cabinets with some AEC functionality embedded in the DCC 16 (i.e., internal). Similar to FIG. 1, the interconnections allow any of the modules 220, 240, 260 to be removed to alter the functionality of the control system 602. Similarly, modules may be added with only rudimentary redefining of the system parameters, as stated above.

The material handling system may be increased or decreased by adding or removing "Steel" modules. With each addition or removal of a "Steel" module, a corresponding control module, or "Copper" module, may be added or removed. This correspondence between the equipment components and the control components allows for a well defined method of expanding or reducing the capacity of the material handling system (i.e., concurrent engineering).

This method may include the steps of: defining a control system architecture for the method, the architecture typically including off the shelf parts; providing a predetermined quantity of control modules for controlling respective parts of the material handling system; adding an additional part to the material handling system for increasing capacity of the material handling system; adding an additional control module for controlling the additional part of the material handling system and interfacing with the predetermined quantity of control modules, the step of adding the additional control module including the inputting of rudimentary data to the control system.

The method may further include the steps of: removing a part of the material handling system for decreasing the capacity of the material handling system; removing the control module responsible for controlling the part of the material handling system; and inputting rudimentary data to remove the control module from the control system hierarchy.

The control modules may include a control cabinet, an external component for controlling an equipment component of the material handling system, and a modular interconnectivity component for interconnecting the control cabinet and the external component for control of the external component by the control cabinet, as described above.

The method may further include the steps of: controlling the entire control system by means of a first control module; controlling a subsystem of the control system by means of a second control module subservient to the first control module; and controlling a part of the subsystem by means of a third control module subservient to the second control module.

Although the invention has been described in conjunction with the preferred embodiments, it is to be appreciated that various modifications may be made without departing from the spirit and scope of the invention as defined by the appended claims.

I claim:

1. A control system for a material handling system, said control system having a first control module, a second control module, and a third control module, said first control module comprising:

a first control cabinet for providing primary control to said first control module and said control system;

a first external component for controlling an equipment component of the material handling system;

a modular interconnectivity component for interconnecting said first control cabinet and said first external component for control of said first external component by said first control cabinet;

a first internal component for operating said first control cabinet, said first internal component being disposed within said first control cabinet; and a modular interconnectivity component for interconnecting said first control cabinet and said first internal external component for communication between said first internal component and said first control cabinet, said first control module having primary control of said second control module and said third control module, said first control module being interconnectable and interoperable with said second control module and said third control module such that said second control module may assume operational control of said third control module in the event that said first control module is removed from said control system.

2. The control system as set forth in claim 1 wherein said second control module comprises:

a second control cabinet for providing primary control to said second control module and said third control module;

a second external component for controlling an equipment component of the material handling system; and a modular interconnectivity component for interconnecting said second control cabinet and said second external component for control of said second external component by said second control cabinet.

3. The control system as set forth in claim 1 further including an existing control system interconnected with said first control module.

4. The control system as set forth in claim 1 wherein said first control module dictates primary control of said control system, said second control module dictates primary control of a subsystem of said control system, and the third control module dictates primary control of a part of said subsystem.

5. The control system as set forth in claim 4 wherein the control of said second control module is subservient to the control of said first control module.

6. The control system as set forth in claim 5 wherein the control of said third control module is subservient to the control of said second control module.

7. The control system as set forth in claim 2 wherein said second control module is capable of assuming primary control of said control system if the first control module is removed from said control system.

8. The control system as set forth in claim 1 wherein said third control module comprises:

a third control cabinet for providing primary control to said third control module, a third external component for controlling an equipment component of the material handling system; and a modular interconnectivity component for interconnecting said third control cabinet and said third external component for control of said third external component by said third control cabinet.

9. The control system as set forth in claim 1 wherein said first control module further includes a second external component for controlling an equipment component of the material handling system.

10. The control system as set forth in claim 1 wherein said third control module includes a third external component for controlling an equipment component of the material handling system.

11. A method for controlling a material handling system, said method comprising the steps of:

defining a control system architecture for said method, the architecture including off the shelf parts;

providing a predetermined quantity of control modules for controlling respective parts of the material handling system;

adding an additional part to the material handling system for increasing capacity of the material handling system;

adding an additional control module to the control system architecture for controlling the additional part of the material handling system and interfacing with the predetermined quantity of control modules, said step of adding the additional control module including the inputting of rudimentary data to the control system.

12. The method as set forth in claim 11 further comprising the steps of:

removing a part of the material handling system for decreasing the capacity of the material handling system;

removing the control module responsible for controlling the part of the material handling system; and inputting rudimentary data to remove the control module from the control system architecture.

13. The method as set forth in claim 11 wherein each of the control modules include a control cabinet, an external component for controlling an equipment component of the material handling system, and a modular interconnectivity component for interconnecting the control cabinet and the external component for control of the external component by the control cabinet.

14. The method as set forth in claim 13 further including the steps of:

controlling the entire control system by means of a first control module;

controlling a subsystem of the control system by means of a second control module subservient to the first control module; and controlling a part of the subsystem by means of a third control module subservient to the second control module.

15. An apparatus for controlling a material handling system, said apparatus comprising:

a first means for controlling said apparatus, said first means comprising a cell coordination cabinet, an associated external component, and a modular interconnectivity component; and a second means for controlling a part of said apparatus, said second means comprising a main control cabinet, an associated external component, and a modular interconnectivity component, said second means assuming control of said apparatus in the event said first means is removed from said apparatus.

16. The apparatus as set forth in claim 15 further comprising a third means for controlling a portion of said part of said apparatus, said third means including a distributed control cabinet, an associated external component, and a modular interconnectivity component, said third means assuming control of said part of said apparatus in the event said second means is removed from said apparatus.

* * * * *